United States Patent [19]

Haynes et al.

[11] 3,971,871

[45] July 27, 1976

[54] TEXTURIZING SIZE AND GLASS FIBERS COATED WITH SAME

[75] Inventors: Harold L. Haynes, Granville; Michael J. Harvey, Newark, both of Ohio

[73] Assignee: Owens-Corning Fiberglas Corporation, Toledo, Ohio

[22] Filed: Apr. 30, 1975

[21] Appl. No.: 572,974

Related U.S. Application Data

[63] Continuation of Ser. No. 408,229, Oct. 19, 1973, abandoned.

[52] U.S. Cl................................ 428/392; 428/375; 428/378; 100/212
[51] Int. Cl.[2] ...................... C08L 3/08; C08L 3/06
[58] Field of Search ............ 100/211, 212; 428/375, 428/378, 392

[56] References Cited

UNITED STATES PATENTS

| | | | |
|---|---|---|---|
| 3,167,468 | 1/1965 | Lovelace et al. | 428/378 |
| 3,615,311 | 10/1971 | Ignatius | 65/3 |
| 3,887,476 | 6/1975 | McConnell | 252/8.8 |

*Primary Examiner*—Theodore Morris
*Attorney, Agent, or Firm*—John W. Overman; Philip R. Cloutier; William P. Hickey

[57] ABSTRACT

A size for glass fibers capable of protecting the fibers from mutual abrasion using 0.6% coating solids or less, and comprising a cationic starch derivative of a tertiary amine along with a cationic lubricant that is generally devoid of primary amines.

10 Claims, No Drawings

TEXTURIZING SIZE AND GLASS FIBERS COATED WITH SAME

This is a continuation of application Ser. No. 408,229, filed Oct. 19, 1973, now abandoned.

BACKGROUND OF THE INVENTION

Strands of glass fibers are produced by pulling several hundred or more tiny molten streams of glass which issue from holes in the bottom of a molten glass tank over a size applying apron to a gathering shoe which groups the fibers together into a strand. This strand then proceeds to a traverse mechanism and winding drum which provides the pulling action which attenuates the molten glass and coils the strand into a package. The fibers are individually separated at the time that they pass over the size applicator, so that the surfaces of the fibers are substantially completely coated before they are drawn together into a strand. This size acts as a lubricant which separates the individual filaments, and if the filaments are not separated by the size, they will scratch each other and break as they are flexed and drawn over guide eyes in the subsequent twisting, weaving, and finishing operations. Starch base sizes have long been used as the base of the coating materials used for separating and lubricating the individual filaments of the strand.

The coiled package that is produced on the winding drum is dried to remove the moisture from the aqueous starch size, and thereafter the strand is uncoiled from the package and is passed over numerous guide eyes which feed the strand onto twist bobbins. As previously indicated, the present invention relates to coatings on fibers that are to be texturized, and this is done by feeding two strands through an air jet which blows apart or separates the filaments of each strand so that the filaments of one strand intermingle with the filaments of the other strand. One of the strands is fed into the jet at a rate faster than the other strand, so that the filaments of the overfed strand are looped to a controlled degree before the filaments of both strands are reunited. Considerable difficulty is experienced in separating the filaments of the strands that are passed through the air jet during the texturizing process, and it has been found that a considerable improvement in the quality of the texturizing strand can be had using the sizes of the present invention instead of the prior art conventional starch size materials.

According to the present invention, it has been determined that a more uniform texturized strand can be produced if the amount of starch base size that is applied to the fibers is kept below that conventionally used for untexturized strands. The amount of starch base solids that are applied to the fibers should be below approximately 0.6% by weight of the coated fibers with optimum results being had at about 0.4% by weight of the coated fibers. It has further been found, however, that conventional starch base sizes will not adequately protect the fibers using such a small amount of size material, and produce excessive fuzz during the twisting operation and breakage of the strand during the texturizing operation. A higher degree of the mutual abrasion between the fibers is encountered during the texturizing operation than is normally encountered in the normal processing of untexturized strands, and in order to protect the fibers during this service, a new and improved type of starch size had to be prepared.

According to principles of the present invention, it has been discovered that an aqueous starch coating on glass fibers in a forming package will leach out sufficient basic materials from the glass fibers to change the pH of the aqueous size coating. It has further been found that most starch materials, and particularly cationic starch materials change viscosity with a change in pH, and that conventional cationic starch materials lose their dispersant power as the pH approaches 7 or above. Where 1% or more of size solids is applied to glass fibers, the change in viscosity of the starch film on the fibers is not critical; but it is critical in applicants' attempts to put less than 1% of starch base coatings onto the fibers. Applicants further discovered that conventional cationic lubricants employ quaternary primary amines, and that quaternary amines cannot be used, since they agglomerate when in thin layers to expose the fibers. This produces fuzz during twisting, and causes the fibers to break during the texturizing operation.

According to further principles of the present invention, it has been discovered that starch materials that are made cationic with a quaternary ammonium radical of a tertiary amine will provide adequate protection of the fibers during twisting and texturizing even though the coatings are present in less than 0.6% by weight—provided that they also include a cationic lubricant that is also made cationic by reason of quaternary ammonium radicals that are practically devoid of primary amines. Emulsified particles of a solid lubricant such as a wax or a gelled oil are preferably also included. It appears that the starch base coating deposits onto the surface of the glass fibers in a bottom layer comprising the cationic starch material, and that the emulsified solid lubricants remain concentrated in the outer surface of the starch base coating to lubricate guide eyes and prevent excessive powdering of the starch. So far as applicants are aware they are the first to produce this type of layered coating which is believed to account for the ability to adequately protect the fibers with less than 0.6% by weight of coating material solids. It is further believed that basic materials are leached out of the fibers to change the pH of prior art cationic starch and cationic lubricant materials after standing, so that they lose their charge, and thereby lose their dispersant powers. This results in an increase in viscosity, and in agglomeration of the starch base materials. It further results in converting the cationic lubricant to a generally nonionic lubricant, and thereby prevents the cationic lubricant from performing its function of attaching to the surface of guide eyes to build up thereon and prevent contact by the glass fibers.

DESCRIPTION OF THE PREFERRED EMBODIMENTS

A preferred embodiment of the invention is prepared from the following materials in the percent or parts by weight designated opposite the particular material:

| Materials | Percent by Weight |
|---|---|
| Cationic starch granules having 0.025 degree of | 2.164 |

| Materials | -continued<br>Percent by Weight |
|---|---|
| substitution of an ether formed by the reaction of the starch with the reaction product of triethylamine and epichlorohydrin according to Pat. No. 2,876,217 | |
| Paraffin wax | 0.424 |
| Nonionic emulsifier for the wax (ether of oleyl alcohol and polyglycol 23) | 0.087 |
| Cationic lubricant devoid of primary amine having the following formula: | 0.304 |

$$H_{35}C_{17}-C=C \qquad H+ \qquad C=C-C_{17}H_{35}$$
$$H-N \quad N-C-C-N-C-C-N \quad N$$
$$C-H \qquad\qquad\qquad C-H$$

| Humectant (Carbowax 300) | 0.217 |
|---|---|
| Water | Balance |

The size was prepared by adding half of the required water in a steam jacketed tank, adding the proper amount of starch, and heating the mixture until it reaches 190°F.. The starch slurry is held at this temperature for 30 minutes following which it is cooled to 150° to 160°F.. The wax, the emulsifier for the wax, the Carbowax, and the cationic lubricant are added to another premix tank and are heated to 180°F. to melt the ingredients. Water at 180°F. is slowly added to the premix tank with agitation until the mixture inverts. The material is then run through a homogenizer and is added to the cooked starch slurry. The balance of the water is then added. The granules of starch material cooked as above described were substantially completely burst to form a thin cationic film forming starch solution. The cationic lubricant may be called Bis-[beta-3-(2-heptadecylimidazolyl) ethylene] amine. Any humectant can be used, and a polyglycol such as polyethylene glycol or polypropylene glycol is preferred.

The size as above prepared was applied to 408 E-glass fibers having a diameter of approximately 0.00035 inch, and the coated fibers were gathered into a strand that was coiled into a package and dried. Fibers from the dried package were put through a twisting machine to form a twist bobbin, and strands from two of such bobbins were put through a Tazjan air jet type texturizing machine to form texturized strands. The twisting and texturizing processes proceeded with a nominal and acceptable amount of powder, and a nominal and acceptable amount of twist fuzz, and the texturized strand that was produced had excellent uniformity and appearance. Strands taken from the dried forming package had a loss on ignition of 0.4% by weight of the coated strands.

EXAMPLE 2

The process of Example 1 is repeated excepting that the granular cationic starch material used has a degree of substitution of 0.05 of a cationic ether formed by reacting the reaction product of epichlorohydrin and dimethylbenzylamine with a pearl corn starch. The texturized strand so produced has substantially the same properties as that given in Example 1 above.

EXAMPLE 3

The process of Example 1 is repeated excepting that the starch ether has a degree of substitution of 0.024, and is the reaction product of starch and the reaction product of epichlorohydrin and N-ethylpiperidine. The texturized strand so produced had substantially the same properties as that given in Example 1.

EXAMPLE 4

The process of Example 1 is repeated excepting that the starch ether is that prepared by reacting granules of a pearl corn starch with the reaction product of epichlorohydrin and N-ethylmorpholine. The texturized strand so produced has generally the same properties as that of Example 1.

EXAMPLE 5

The process of Example 1 is repeated excepting that the starch granules are a starch ether of the reaction product of epichlorohydrin and dimethylstearylamine. The texturized size so produced has substantially the same properties as that given in Example 1 above.

EXAMPLE 6

The process of Example 5 is repeated excepting that the cationic lubricant used is dimethylstearylamine, and the texturized strand so produced has substantially the same properties as that given in Example 5 above. The cationic lubricant used is Armeen DM18 made by Armour and Company.

EXAMPLE 7

The process of Example 1 is repeated excepting that the cationic lubricant used is 1-hydroxyethyl-2,heptadecadienyl imidazoline (Fatchemco-T) made by Universal Chemicals Company. The texturized strand so produced has substantially the same properties as that of Example 1.

An Example *not* according to the present invention, but given to show that primary amines are detrimental is now given.

EXAMPLE 8

The procedure of Example 1 was repeated excepting that the cationic lubricant is replaced with a primary fatty amine mixture sold under the tradename "Armeen 8" by the Armour Industrial Chemical Company. The product so produced was extremely fuzzy during twisting and the strand broke during texturizing.

As previously explained, the starches of the present invention are cationic starches, that is granular starch ethers and/or starch esters which contain a quaternary ammonium radical of tertiary amines and wherein the granules have a degree of substitution of the cationic starch ether or ester radical in an amount of from approximately 0.01% to 0.1% of the reactive OH sites of the starch material. Such materials can easily be prepared by reacting starch granules with the reaction product of a tertiary amine and epichlorohydrin to give a material having the following formula:

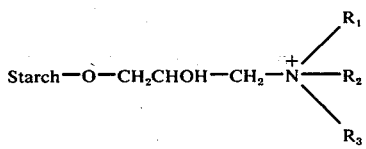

wherein $R_1$, $R_2$, and $R_3$ are from the group of alkyl, substituted alkyl, alkene, aryl, and aralkyl and wherein $R_1$, $R_2$, and $R_3$ have a total of up to 22 carbon atoms. The cationic materials that are used must also be generally devoid of primary amines and contain cationic radicals comprising secondary or tertiary amines, or are amines in ring compounds, such as occur in imidazolines, morpholines, diazonium compounds, hydrazines, hydantoins, pyridines, pyrroles, and substitution products of the above. The solid lubricants are preferably paraffin waxes but can include oils that have been made solid at room temperatures by the addition of gelling agents as disclosed in U.S. Pat. No. 3,533,768.

The size compositions of the present invention will have utility as coating for glass fibers whether or not they are to be used in producing texturized fibers; but where they are to be used for texturizing fibers, the amount that is applied to the fibers would preferably be less than 0.6% and more than 0.2% by weight of the coated fibers. For texturizing sizes, the sizes will preferably include the following material in the percentages by weight given:

| Materials | Percent By Weight |
| --- | --- |
| Starch having a degree of substitution of from approximately 0.01 to 0.1% of an ether or ester radical of a tertiary amine and that is generally devoid of primary amines | 1.25 to 3.00 |
| Nonionic lubricant | 0.2 to 0.8 |
| Nonionic lubricant emulsifier | 0.04 to 0.16 |
| Cationic lubricant generally devoid of primary amines | 0.1 to 0.6 |
| Humectant | 0 to 1.0 |
| Water | Balance |

It will also be understood that the size compositions given above may include minor amounts of other materials such as bactericides, diluents, unburst starch granules, etc. in amounts which do not interfere with the functions produced by the various ingredients, and that the coating of the dried materials on the fibers are assumed herein and in the claims to constitute the materials given above in the amounts stated to be used in the aqueous size materials but expressed as parts by weight.

While the invention has been described in considerable detail, we do not wish to be limited to the particular embodiments shown and described, and it is our intention to cover hereby all novel adaptations, modifications, and arrangements thereof which come within the practice of those skilled in the art to which the invention relates and which is covered by the following claims.

We claim:

1. Glass fibers having a coating consisting essentially of the following solids in approximate parts by weight: 1.25 to 3.00 of a starch having a degree of substitution of from approximately 0.01% to 0.1% of an ether or ester radical of a tertiary amine and that is generally devoid of primary amines, 0.2 to 0.8 of a nonionic lubricant, 0.04 to 0.16 of a nonionic lubricant emulsifier, 0.1 to 0.6 of Bis-beta-3-(2-heptadecylimidazolyl) ethyl amine, and 0 to 1.0 of a humectant.

2. The glass fibers of claim 1 wherein said nonionic lubricant is from the group consisting of animal, vegetable, and mineral waxes and gelled oils.

3. The glass fibers of claim 1 wherein said starch derivative has the following formula:

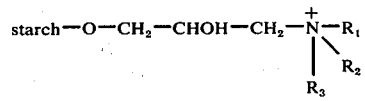

wherein $R_1$, $R_2$, and $R_3$ are from the group consisting of alkyl, substituted alkyl, alkene, aryl, and aralkyl groups having a total of not more than 22 carbon atoms.

4. The glass fibers of claim 2 wherein said starch derivative has the following formula:

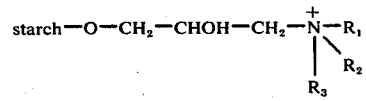

wherein $R_1$, $R_2$, and $R_3$ are from the group consisting of alkyl, substituted alkyl, alkene, aryl, and aralkyl groups having a total of not more than 22 carbon atoms.

5. The glass fibers of claim 4 wherein said emulsifier is a polyglycol ether of a fatty alcohol.

6. The glass fibers of claim 5 wherein said humectant is a polyglycol.

7. Glass fibers having a coating comprising the following approximate parts by weight of solids: 2.16 of a starch having a degree of substitution of from approximately 0.01% to 0.1% of an ether or ester radical of a tertiary amine and that is generally devoid of primary amines, 0.42 of paraffin wax, 0.09 of oleyl ether of polyethylene glycol 23, 0.30 of Bis-[beta-3-(2-heptadecylimidazolyl) ethyl] amine, and 0.22 of a humectant.

8. The glass fibers of claim 1 wherein the coating comprises from approximately 0.2 to 0.6% of the weight of the coated glass fibers.

9. The glass fibers of claim 7 wherein the coating comprises from approximately 0.2 to 0.6% of the weight of the coated glass fibers.

10. Texturized glass fibers having a coating thereon consisting essentially of the following solids in approximate parts by weight: 1.25 to 3.00 of a starch having a degree of substitution of from approximately 0.01% to 0.1% of an ether or ester radical of a tertiary amine and that is generally devoid of primary amines, 0.2 to 0.8 of a nonionic lubricant, 0.04 to 0.16 of a nonionic lubricant emulsifier, 0.1 to 0.6 of a cationic lubricant comprising Bis-[beta-3-(2-heptadecylimidazolyl) ethylene] amine and being generally devoid of primary amines, and 0 to 1.0 of a humectant, said coating comprising no more than 0.6% of the weight of the coated glass fibers, with the starch being unagglomerated.

* * * * *